US007431896B2

(12) United States Patent
Biel, Jr. et al.

(10) Patent No.: US 7,431,896 B2
(45) Date of Patent: Oct. 7, 2008

(54) VACUUM-INSULATED EXHAUST TREATMENT DEVICES, SUCH AS CATALYTIC CONVERTERS, WITH PASSIVE CONTROLS

(75) Inventors: John P. Biel, Jr., Grand Rapids, MI (US); David K. Benson, Golden, CO (US); Steven D. Burch, Honeoye Falls, NY (US); Frederick B. Hill, Jr., Rockford, MI (US); Matthew A. Keyser, Arvada, CO (US); Lance Mews, Caledonia, MI (US); Donald R. Rigsby, Jenison, MI (US); C. Edwin Tracy, Golden, CO (US)

(73) Assignee: Benteler Automotive Corporation, Auburn Hills, MI (US)

( * ) Notice: Subject to any disclaimer, the term of this patent is extended or adjusted under 35 U.S.C. 154(b) by 671 days.

(21) Appl. No.: 11/145,339

(22) Filed: Jun. 2, 2005

(65) Prior Publication Data

US 2005/0271562 A1    Dec. 8, 2005

Related U.S. Application Data

(63) Continuation of application No. 09/889,646, filed on Jul. 19, 2001, now Pat. No. 6,908,595.

(51) Int. Cl.
*B01D 50/00* (2006.01)
*B21D 51/16* (2006.01)
(52) U.S. Cl. .................. 422/179; 422/180; 422/177; 29/890
(58) Field of Classification Search .................. 422/177, 422/179, 180; 29/890
See application file for complete search history.

(56) References Cited

U.S. PATENT DOCUMENTS 3,167,159 A    1/1965    Bovenkerk (Continued)

OTHER PUBLICATIONS

Dr. Paolo Della Porta-Saes Getters S.P.A., "Gettering" an Integral Part of Vacuum Technology, Presented at American Vacuum Society 39th National Symposioum, Nov. 9-13, 1992, 14 pgs.

(Continued)

*Primary Examiner*—Glenn Caldarola
*Assistant Examiner*—Tom Duong
(74) *Attorney, Agent, or Firm*—Price, Heneveld, Cooper, DeWitt & Litton, LLP

(57) ABSTRACT

A thermally-activated exhaust treatment device, such as a catalytic converter, for vehicles includes a core having an inner housing and a catalytic material. A jacket includes an outer housing enclosing the inner housing, but characteristically not contacting the inner housing. The inner and outer housings include walls forming a vacuum-drawn sealed insulation cavity around the inner housing. A temperature-activated variable insulator device is positioned within the outer housing and includes a hydrogen source and controls for controlling the variable insulator device. A vacuum-maintenance device is incorporated into the insulation cavity, and includes a small container, getter material positioned in the container, and a porous member allowing gas in the insulation cavity to communicate with the getter material. A multi-layered radiation shield is positioned in the vacuum space and is loosely coupled to the inner housing. A vacuum detector includes a visible indicator of the vacuum in the insulation cavity.

37 Claims, 9 Drawing Sheets

U.S. PATENT DOCUMENTS

| | | |
|---|---|---|
| 3,823,305 A | 7/1974 | Schroder |
| 4,572,864 A | 2/1986 | Benson et al. |
| 4,702,853 A | 10/1987 | Benson et al. |
| 4,860,729 A | 8/1989 | Benson et al. |
| 5,140,811 A | 8/1992 | Minami et al. |
| 5,163,289 A | 11/1992 | Bainbridge |
| 5,318,108 A | 6/1994 | Benson et al. |
| 5,419,876 A | 5/1995 | Usui et al. |
| 5,477,676 A | 12/1995 | Benson et al. |
| 5,562,154 A | 10/1996 | Benson et al. |

OTHER PUBLICATIONS

Saes Getters S.P.A., St 707™ Non-Evaporable Getters Activatable at Low Temperatures, Not Dated, 13 pgs.

Saes Getters, S.P.A., St 101® Non-Evaporable Getters, © 101 920630 Saes Getters S.p.A., Not Dated, 15 pgs.

Burch et al, "Reducing Cold-Start Emissions by Catalytic Converter Thermal Managment", SAE #950409, Dated 1995, pp. 1-6.

Burch et al, "Applications and Benefies of Catalytic Converter Thermal Management", SAE #961134, Dated 1996, pp. 1-6.

NREL Technology Brief, "Keeping the Heat on Cold-Start Emissions", Dated May 1996, pp. 1-4.

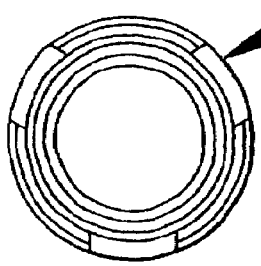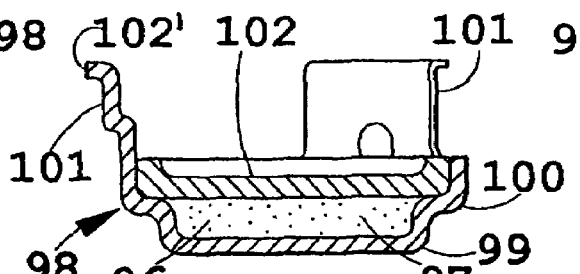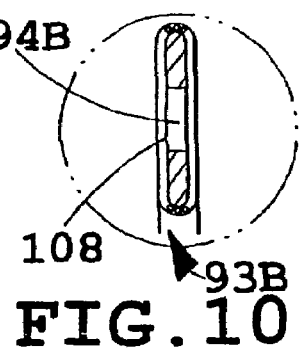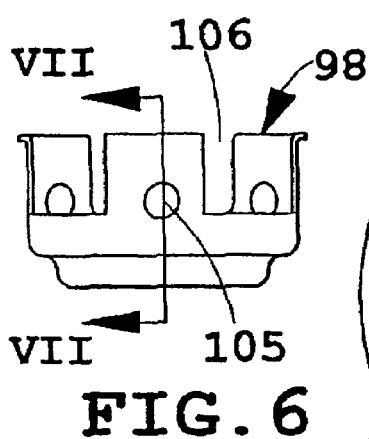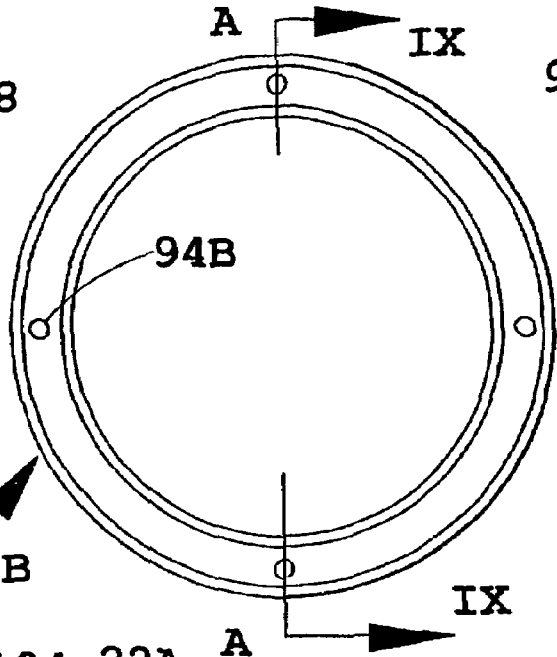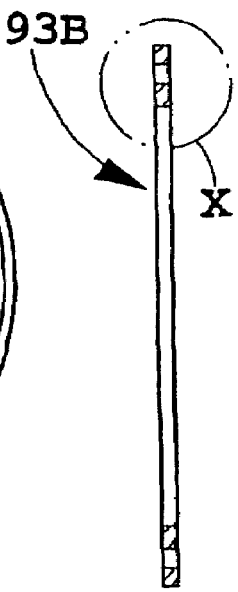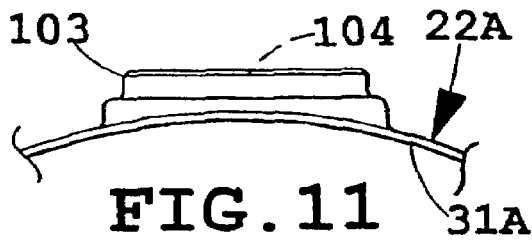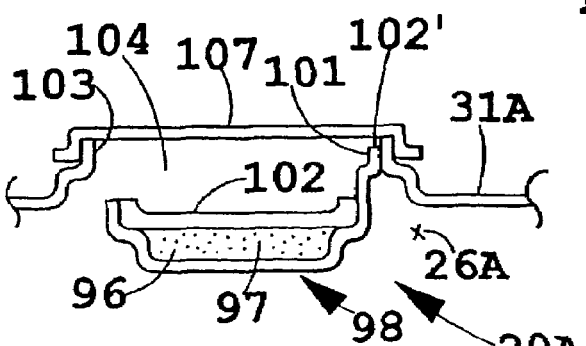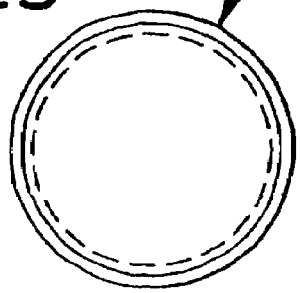

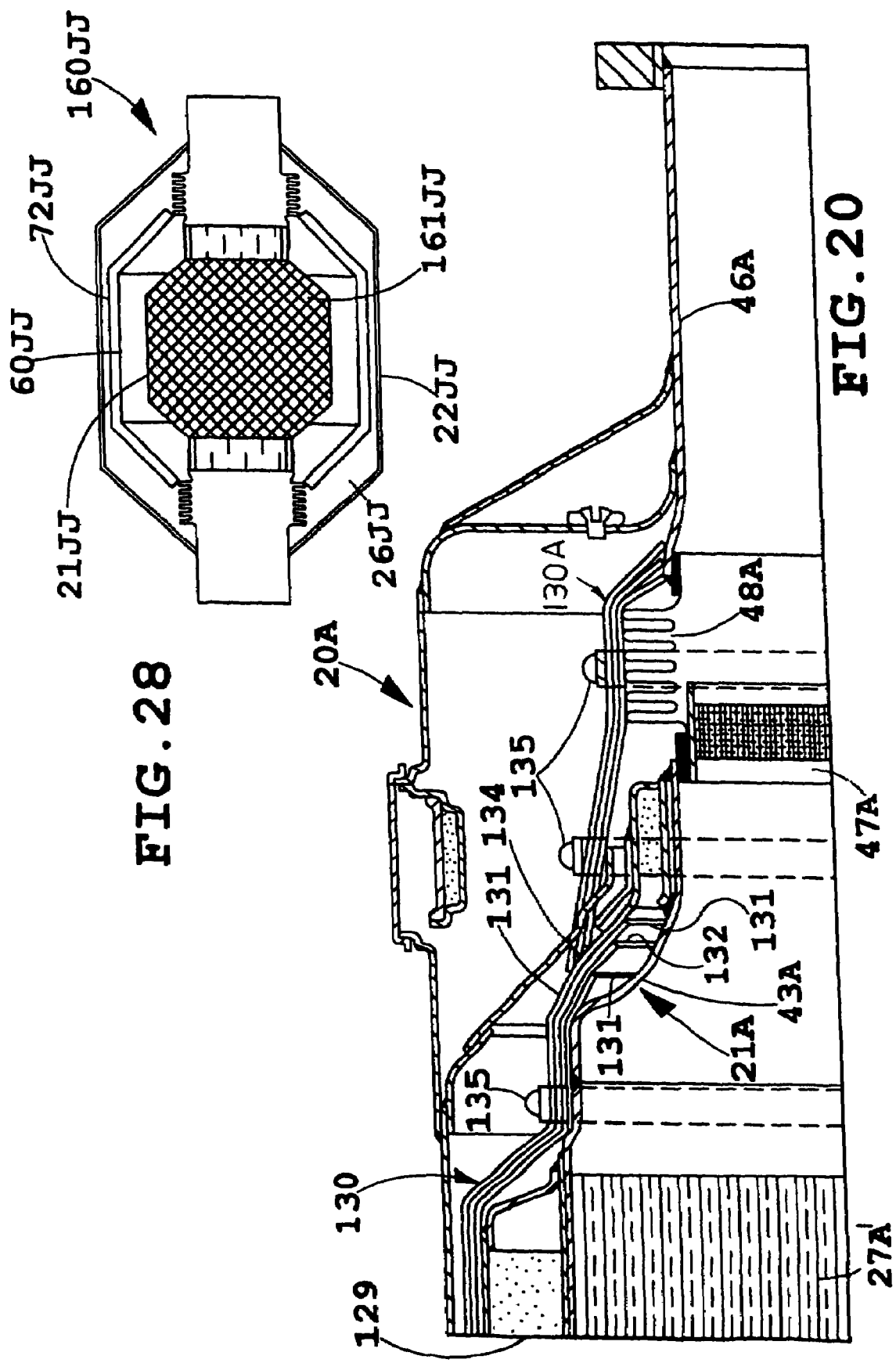

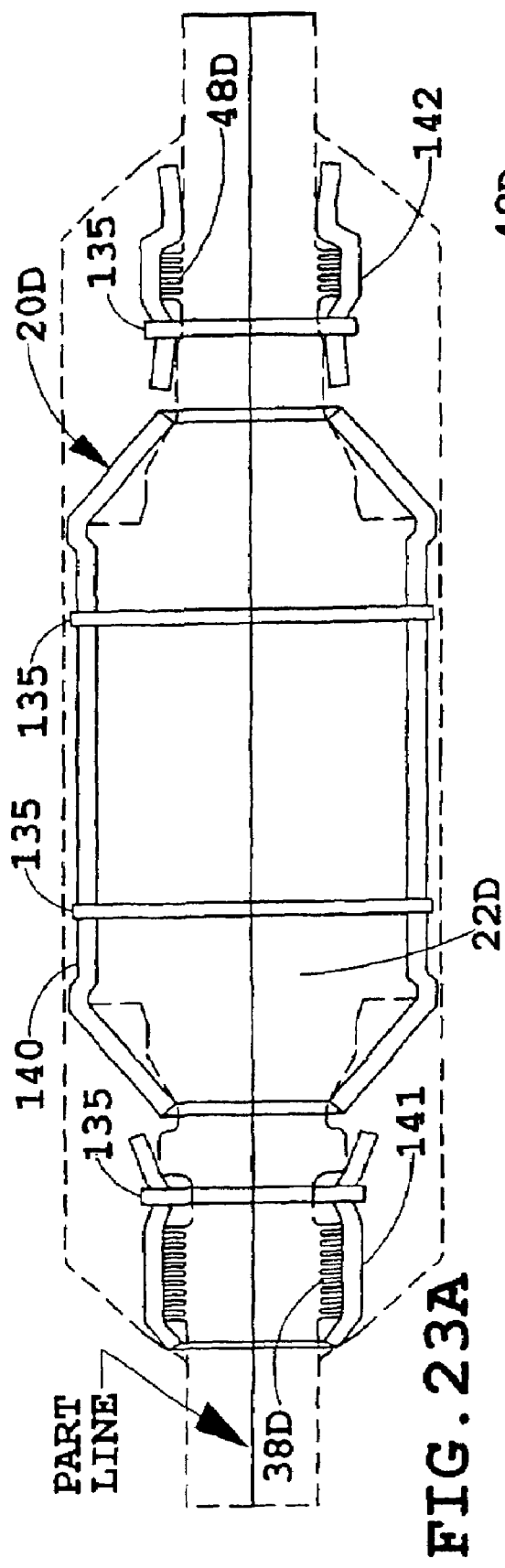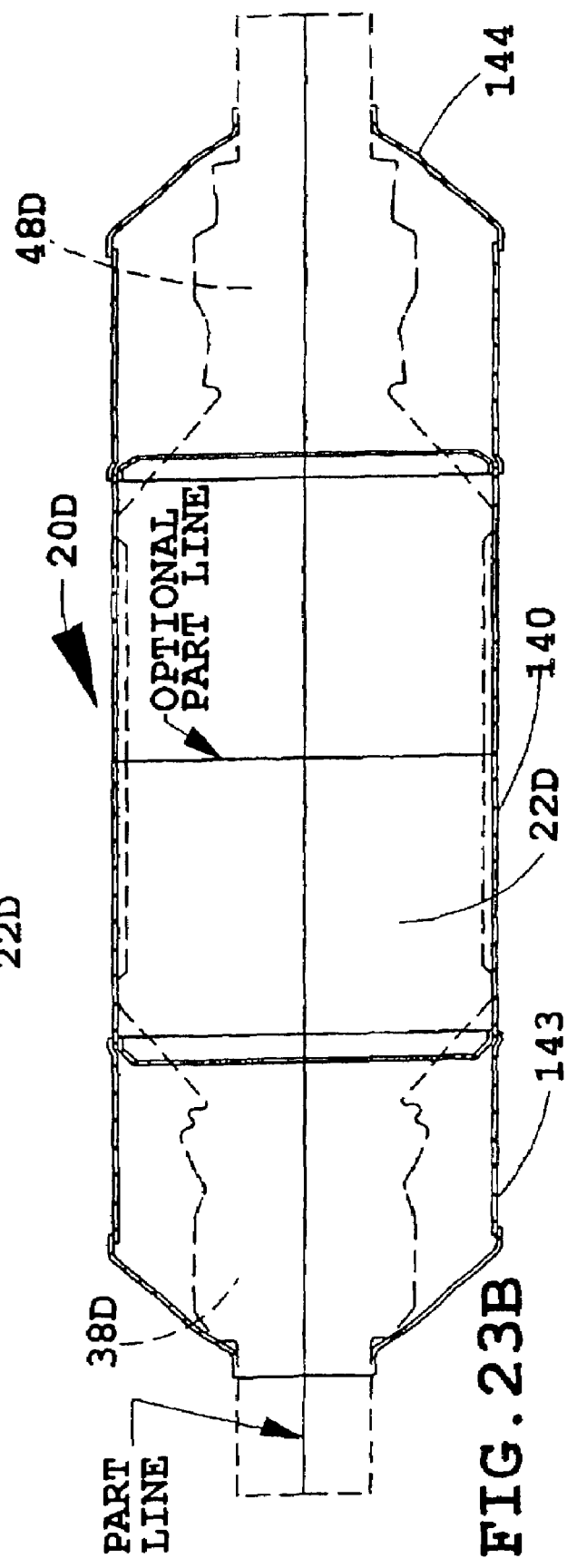

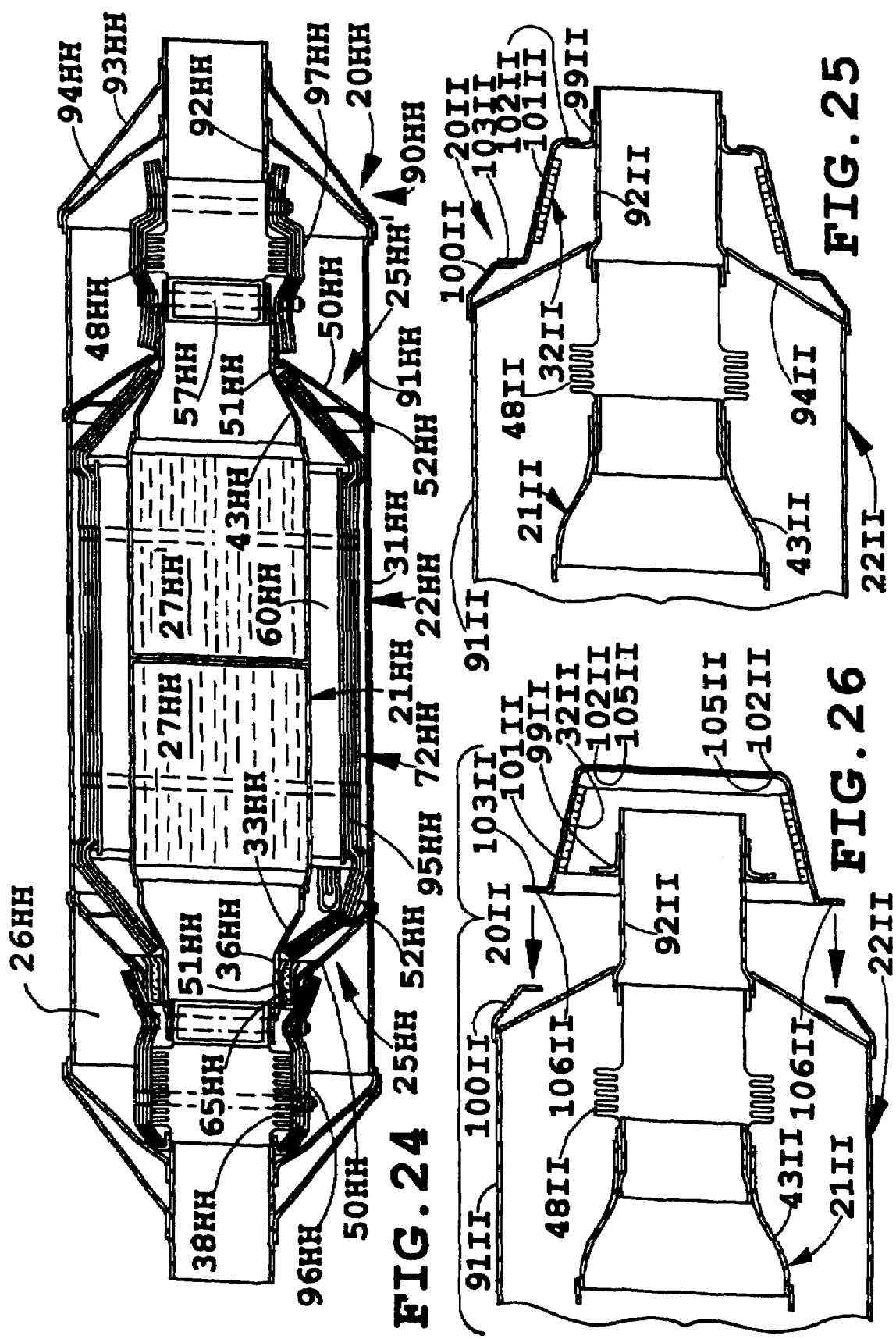

VACUUM-INSULATED EXHAUST TREATMENT DEVICES, SUCH AS CATALYTIC CONVERTERS, WITH PASSIVE CONTROLS

This application is a continuation of U.S. application Ser. No. 09/889,646 filed Jul. 19, 2001, now U.S. Pat. No. 6,908,595.

BACKGROUND OF THE INVENTION

The present apparatus relates to automotive exhaust systems, and more particularly relates to exhaust treatment devices such as catalytic converters and particulate traps that are vacuum-insulated and that have hydrides to variably control the thermal insulative value in the vacuum cavity and further that have getters to help preserve the vacuum for a longer period of time while in service.

Most vehicle exhaust systems and particularly exhaust systems of vehicles powered by internal combustion engines are equipped with catalytic converters for reducing noxious emissions in exhaust gases. Many vehicles such as those powered by a diesel engine also include particulate traps for reducing emission of particulates. A problem exists in that a large part of tailpipe emissions (such as HC, CO, NOx and/or particulates) occur during the initial cold start phase when the catalytic converter and particulate traps are least effective.

More specifically, modern engine exhaust treatment systems for vehicles include a catalytic converter which converts toxic exhaust emissions to non-toxic gases. The oxidative and reductive reactions that convert the emissions occur on the hot catalytically active surface of the converter. Until the converter is heated to a sufficiently high temperature, these reactions do not occur efficiently such that exhaust gases pass through the system untreated. EPA estimates indicate that as much as 80% of all automobile commuter exhaust emissions occur during the so-called "cold start" period when the catalytic converter is heating up to operational temperature.

A vacuum-insulated catalytic converter with included thermal energy storage improves the efficiency of engine exhaust emissions treatment by remaining hot long after the engine is shut off. If the engine is not shut off for too long, the still hot and catalytically active converter is immediately effective the next time the engine is used and avoids the "cold start" emission of untreated exhaust gases. The catalytic converter may also include a variable insulating system having an electrically heated, reversible source of hydrogen that communicates with the vacuum-insulated shell of the converter. This electrically controlled source of hydrogen provides a variable conductivity means of limiting the temperature of the converter so as to prevent it from overheating and suffering damage. Specifically, the hydrogen source captures hydrogen at low temperatures to maximize the insulative value of the vacuum cavity at the low temperatures, but releases hydrogen once the catalytic converter reaches a predetermined "light-off" temperature at which the catalytic reaction becomes exothermic. The presence of the hydrogen in the vacuum cavity increases the thermal conductivity across the vacuum cavity of the catalytic converter, thus assisting in removing heat to prevent overheating and damage to the catalytic materials.

However, passive thermal energy storage systems and the variable insulation systems have problems. In passive thermal energy storage systems, the thermal energy storage material is well-connected thermally to the catalytic converter so that heat will readily flow from the thermal energy storage material to the catalytic converter when it requires heat. However, when the converter has sat for a long time and the thermal energy storage material has cooled, this close coupling will draw heat from the hot exhaust gas stream and from the catalyst until the thermal energy storage material itself is heated to a high temperature. This will require a particularly long time during which untreated exhaust gases will be emitted. Thus, while the above-discussed design is effective in reducing "cold start" emissions when it is hot, it actually exacerbates the "cold start" problem whenever the converter has been allowed to cool. Notably, no matter how effectively the converter stores heat, there will be times when it has cooled and will suffer from some degree of "cold start" emissions. The electrically heated and controlled hydrogen source disclosed in Benson U.S. Pat. No. 5,477,676 to prevent the converter from overheating requires complex and expensive wiring to the catalytic converter. This wiring and control system also adds to the vulnerability of the exhaust system to failure and increases the risk of a warranty liability or expensive model recall action by the manufacturer. This can be a serious problem, particularly given the severe environments that exhaust systems are subjected to.

Yet another problem with vacuum-insulated catalytic converters is that it is difficult to tell if the vacuum exists, after the system is put on a vehicle and subjected to use. It is known to use a getter material to help preserve a vacuum. Getter materials combine with gases to form solids (or absorb gases into their atomic matrix) which helps maintain a sufficient vacuum in a sealed chamber. However, getter materials have a maximum absorbence value after which they are no longer effective. A catalytic converter structure is desired that facilitates placing a getter material within a vacuum cavity in a catalytic converter without using up the getter material prior to drawing a high vacuum in the cavity. It is desirable to seal a vacuum cavity prior to activating a getter material. But once a cavity is sealed, there is no economical or easy access to the vacuum cavity to allow measurement of the vacuum level.

Particulate traps, often used on diesel exhaust emissions, have similar problems to catalytic converters, in that they are most effective when at a minimum operating temperature. For example, vacuum-insulated structures are desired, including variable thermal insulative control, reduced thermal loss at low temperature and after engine shut-off, vacuum detection/indication after assembly, and the like. Another problem of particulate traps is their high weight.

Accordingly, exhaust treatment devices/structures are desired solving the aforementioned problems and offering the aforementioned advantages.

SUMMARY OF THE INVENTION

In one aspect of the present invention, a thermally-activated exhaust treatment device, such as a catalytic converter, is adapted to control exhaust emissions in a vehicle. The device includes an inner housing having a first inlet and a first outlet defining a longitudinal direction and having an exhaust treating device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second inlet and a second outlet that align with the first inlet and the first outlet of the inner housing. The inner and outer housings include walls forming a sealed insulation cavity around the inner housing, with the insulation cavity having a vacuum drawn therein. A passive, temperature-activated variable insulator device is positioned within the outer housing in communication with the insulation cavity. The variable insulator device includes a hydrogen source that obviates a need for separate electrical wiring and controls for controlling the temperature of the variable insulator device.

In another aspect of the present invention, a device adapted to control exhaust emissions in a vehicle includes an inner housing having a first inlet and a first outlet defining a longitudinal direction and having an exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second inlet and a second outlet that align with the first inlet and the first outlet of the inner housing. The inner and outer housings include walls forming a sealed insulation cavity around the inner housing, with the insulation cavity having a vacuum drawn therein. A vacuum maintenance device is incorporated into the insulation cavity. The vacuum maintenance device includes a container, getter material positioned in the container, a porous member allowing gas in the insulation cavity to communicate with the getter material, and a gate covers the porous member to prevent the gas in the insulation cavity from communicating with the getter material. The gate has a high melting point such that the insulation cavity can be pumped-down, baked, and sealed at a lower first temperature and then the gate can be melted away to uncover the porous member at a higher second temperature.

In another aspect of the present invention, an exhaust treatment device adapted to control exhaust emissions in a vehicle includes an inner housing having a first inlet and a first outlet defining a longitudinal direction and having a thermally-activated exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second inlet and a second outlet that align with the first inlet and the first outlet of the inner housing. The inner and outer housings include walls forming a sealed insulation cavity around the inner housing, the insulation cavity having a vacuum drawn therein. A getter device is provided that includes a getter material constructed to act as a vacuum pump to maintain a vacuum in the insulation cavity. A hydrogen-releasing device is also provided that includes hydride material separate from the getter device. The hydride material is configured to release hydrogen when an elevated temperature range is reached and to reabsorb hydrogen upon cooling.

In another aspect, an exhaust treatment device adapted to control exhaust emissions in a vehicle includes an inner housing having a first inlet and a first outlet defining a longitudinal direction and having a thermally-active exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second inlet and a second outlet that align with the first inlet and the first outlet of the inner housing. The inner and outer housings include walls forming a sealed insulation cavity around the inner housing, the insulation cavity having a vacuum drawn therein. A multi-layered radiation shield comprised of alternating layers of insulation material and radiant energy reflective materials is positioned in the insulation cavity around the inner housing.

In another aspect, an exhaust treatment device adapted to control exhaust emissions in a vehicle includes an inner housing having a first sidewall, a first inlet end cone defining a first inlet, a first outlet end cone defining a first outlet, and having a thermally-activated exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second sidewall, a second inlet end cone defining a second inlet, a second outlet end cone defining a second outlet. The inner and outer housings form a sealed insulation cavity around the inner housing, with the insulation cavity having a vacuum drawn therein. A radiation shield is placed in the vacuum space and includes a center portion, an inlet end portion and a outlet end portion that form a continuous barrier to radiation loss of heat from the inner housing. The center portion is located between the first and second sidewalls, with the inlet end portion being located at the first and second inlet end cones, and the outlet end portion being located at the first and second outlet end cones.

In another aspect, an exhaust treatment device adapted to control exhaust emissions in a vehicle includes an inner housing having a first sidewall, a first inlet end cone defining a first inlet, a first outlet end cone defining a first outlet, and having a thermally-activated exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second sidewall, a second inlet end cone defining a second inlet, and a second outlet end cone defining a second outlet. The inner and outer housings form a sealed insulation cavity around the inner housing, with the insulation cavity having a vacuum drawn therein. A radiation shield is provided with air passages. The radiation shield is extended around and loosely coupled to the thermal energy storage material and the inner housing. The radiation shield is configured to assist with thermal communication the emissions treatment device and the outer housing primarily through hydrogen gas conductance when the emissions treatment device is hot and generating an exothermic reaction.

In another aspect, an exhaust treatment device adapted to control exhaust emissions in a vehicle includes an inner housing having a first sidewall, a first inlet end cone defining a first inlet, a first outlet end cone defining a first outlet, and having a thermally-activated exhaust treatment device therein chosen to reduce undesirable emissions from the exhaust of a combustion engine as the exhaust passes from the first inlet to the first outlet. The device further includes an outer housing enclosing the inner housing but characteristically not contacting the inner housing. The outer housing includes a second sidewall, a second inlet end cone defining a second inlet, a second outlet end cone defining a second outlet, the inner and outer housings forming a sealed insulation cavity around the inner housing, the insulation cavity having a vacuum drawn therein. A vacuum detector is operably connected to the insulation cavity. The vacuum detector includes a visible indicator of the vacuum in the insulation cavity.

These and other feature, advantages, and objects of the present invention will be further understood and appreciated by those skilled in the art by reference to the following specification, claims, and appended drawings.

DESCRIPTION OF DRAWINGS

FIGS. 5-6 are plan and side views of one type of the container of getter and hydride material shown in FIG. 4;

FIG. 7 is a cross-sectional view taken along the line VII-VII in FIG. 6;

FIG. 8 is a plan view of one type of construction of the hydride material;

FIG. 9 is a cross-sectional view taken along lines IX-IX in FIG. 8;

FIG. 10 is an enlargement of the circled area in FIG. 9;

FIG. 11 is a fragmentary side view of the structure forming the opening in the outer housing, the opening being shaped to receive the getter container and cap/lid in FIGS. 5-6;

FIG. 12 is a cross-sectional view similar to FIG. 11, but shown as longitudinally cut apart and with the getter container installed and with the vacuum detector/seal cap installed;

FIG. 13 is a side cross-sectional view of the vacuum detector/seal cap that covers the opening;

FIG. 14 is a plan view of the vacuum detector/seal cap shown in FIG. 13;

FIG. 20 is a fragmentary side cross-sectional view of a modified catalytic converter including a leafed layered radiation shield;

FIGS. 23A and 23B are cross-sectional views of modified catalytic converters having radiation end shields;

FIG. 24 is a cross-sectional view of a modified catalytic converter;

FIG. 25 is a fragmentary cross-sectional view of a modified catalytic converter;

FIG. 26 is an exploded view of FIG. 25;

FIG. 28 is a schematic view of a particulate trap embodying the present invention.

DETAILED DESCRIPTION OF PREFERRED EMBODIMENTS

Figure 1:
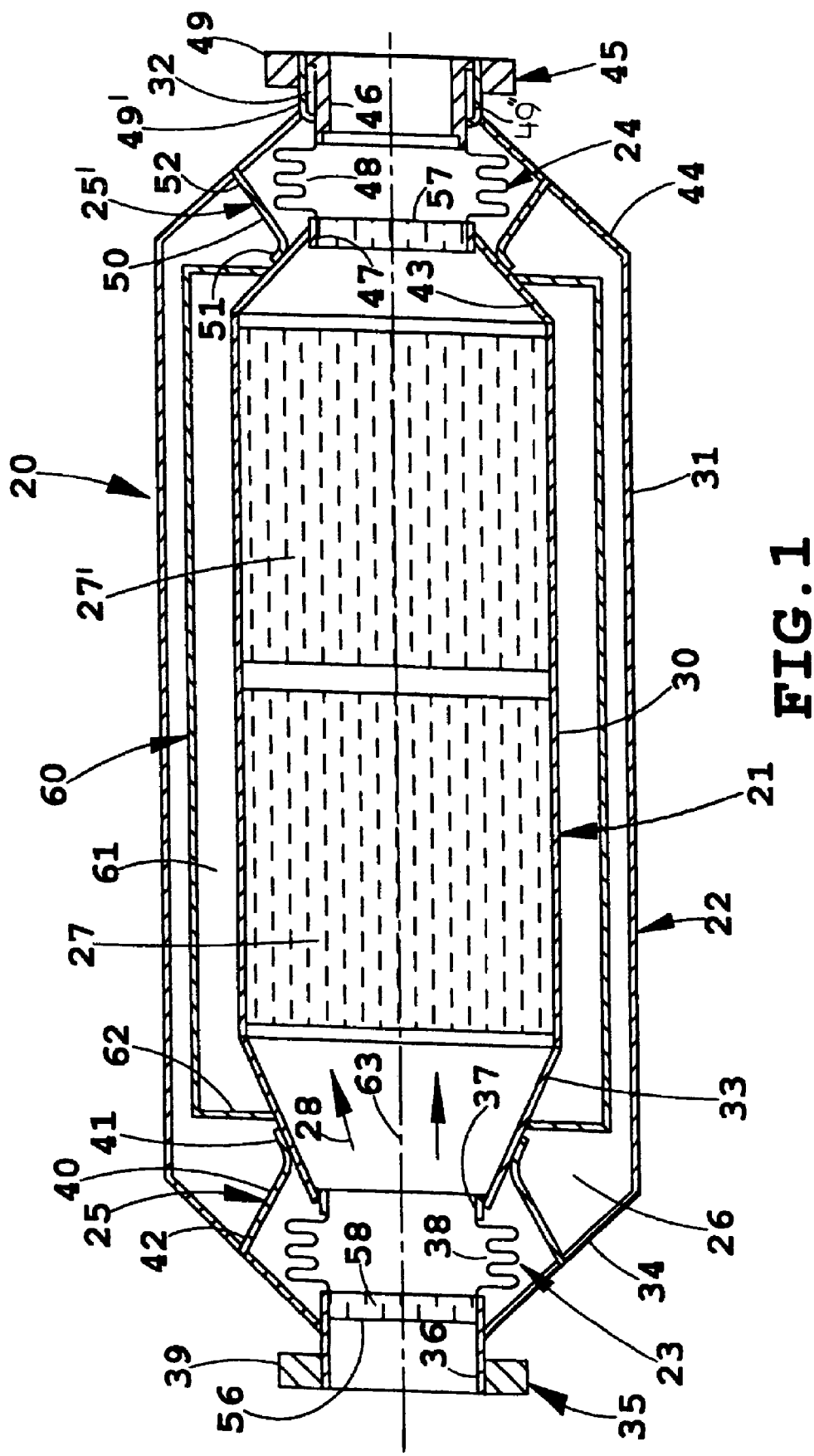
FIG. 1 is a cross-sectional view of a catalytic converter embodying the present invention.

The illustrated catalytic converter 20 (FIG. 1) is a vacuum-insulated converter having an inner housing 21 positioned within and insulated from an outer housing 22. Expansion joints 23 and 24 are provided at each end of the inner housing 21, and supports 25 and 25' are provided to support the inner housing 21 within the outer housing 22 while maintaining a vacuum-insulated cavity 26 forming a relatively constant gap around the inner housing 21. A sufficient vacuum is drawn on the cavity 26 so as to eliminate heat loss from air conduction and convection. The supports 25 and 25' within the converter design are particularly configured to accommodate longitudinal thermal expansion of the hot inner housing 21 relative to the cool outer housing 22. The internal supports 25 and 25' bridge the vacuum insulation and are sufficiently stiff to accommodate dynamic (vibration and impact) loads at temperature, yet are flexible enough to accommodate unequal thermal expansion of the inner and outer housings 21 and 22, and further are of minimal cross-sectional size and minimal conductance to minimize heat loss.

More specifically, the inner housing 21 is preferably fabricated of metal or other material that is impermeable to gases, and is adapted to contain one or more catalyst substrates 27 and 27'. Exhaust gases from an internal combustion engine flow through the catalytic converter 20, as indicated by the arrows 28, including through the numerous small, catalyst-coated pores or channels that are formed in the catalytic substrates 27 and 27'. The inner housing 21 is enclosed within the outer housing 22, and its sidewall 30 is spaced radially inwardly from the sidewall 31 of the outer housing with the supports 25 and 25' supporting it to maintain a relatively constant gap. The outer housing 22 is also preferably fabricated of metal or other material that is impermeable to gases, even in hot and high-order vacuum environments. The cavity 26 forms an annular space between the inner and outer housings 21 and 22 that is evacuated to form a sufficient vacuum for insulative purposes. The insulating performance of the cavity 26 is variably controlled by a temperature sensitive hydrogen source device that includes a hydride material, and the vacuum is maintained by a separate vacuum maintenance device that includes a getter material, which are collectively referenced by the numeral 32 in FIG. 1, as discussed below.

A funnel-shaped inner inlet end cone 33 is attached to the inlet end of the sidewall 30 of the inner housing 21, and a funnel-shaped outer inlet end cone 34 is attached to inlet end of the sidewall 31 of the outer housing 22. An inlet subassembly 35 includes an inlet tube section 36 attached to the open end of the outer inlet end cone 34, and an inlet tube section 37 attached to the open end of the inner inlet end cone 33. A bellows 38 is attached between the inboard and outboard inlet tube sections 36 and 37, the bellows 38 being configured to allow dissimilar longitudinal thermal expansion of the inner and outer housings 21 and 22. An end of the inlet tube section 36 projects from the outer inlet end cone 34, and an annular attachment flange 39 is secured to the inlet tube section 36 for attaching the catalytic converter 20 to an engine exhaust pipe. The illustrated supports 25 extend from the outer inlet end cone 34 to the inner inlet end cone 33 at a plurality of circumferentially spaced positions. The supports 25 include spokes 40, a hub flange 41 and a rim flange 42 that abut and are joined to the inner and outer inlet end cones 33 and 34.

A funnel-shaped inner outlet end cone 43 is attached to or formed in the outlet end of the sidewall 30 of the inner housing 21, and a funnel-shaped outer outlet end cone 44 is attached to the outlet end of the sidewall 31 of the outer housing 22. An outlet subassembly 45 includes an outlet tube section 46 attached to the open end of the outer outlet end cone 44, and an outlet tube section 47 attached to the open end of the inner outlet end cone 43. A bellows 48 is attached between the inboard and outboard outlet tube sections 46 and 47, the bellows 48 being configured to allow dissimilar longitudinal thermal expansion of the inner and outer housings 21 and 22. An end of the outlet tube section 46 projects from the outer outlet end cone 44. It includes a tube 49' shaped to form an annular space for getter and/or hydride material. An exhaust pipe attachment flange 49 is secured to the outlet tube section 46 for attaching the catalytic converter 20 to an engine manifold exhaust pipe. The illustrated supports 25' extend from the outer outlet end cone 44 to the inner outlet end cone 43 at a plurality of circumferentially spaced positions. The supports 25' include spokes 50, a hub flange 51, and a rim flange 52 that abut and are welded to the inboard and outboard inlet end cones 43 and 44. The illustrated reinforcement tube 49' and outlet tube section 46 are fixed together, and define a space 49" therebetween filled with getter and/or hydride material. The hydride material recaptures hydrogen from the insulating cavity 26 when the catalytic converter 20 is at a low temperature to increase the insulating effect of the vacuum at low temperature (which helps the catalytic converter reach its operating temperature more quickly). The hydride releases hydrogen to increase conductivity when the catalytic converter 20 is at a high temperature (which helps prevent overheating). The getter material removes gases from the cavity 26, and helps maintain the sufficient vacuum in the cavity 26 for a longer service life.

End shields 56 and 57 are placed in the inlet and outlet outer tube sections 36 and 46, respectively, adjacent an outer end of the bellows 38 and 48. The end shields 56 and 57 include a plurality of holes 58 that reduce turbulence in the flow of exhaust gases through the catalytic converter 20, and also the end shields 56 and 57 slow convection heat transfer and help retain the heat within the catalytic converter 20 when the flow of exhaust stops. Further, the end shields 56 and 57 may include catalytic material themselves if desired.

A phase-change material (PCM)-containing intermediate housing 60 including annular end walls 62 is attached to the sidewall of the inner housing 21 in the cavity 26, and forms a sealed separate chamber around the inner housing 22. Phase change material 61 is placed in the chamber of housing 60. The phase change material 61 is formulated to change its phase and store heat during the heat-up period of the catalytic converter, and further is configured to release heat during cool-down of the catalytic converter 20. The result is that the phase change material 61 causes the inner housing 21 and catalytic materials 27 and 27' to reach their "light-off" temperatures much more quickly. Once the catalytic materials reach the "light-off" temperature (usually about 315-430 degrees C.), the temperature of the catalytic converter 20 raises rapidly to its operating temperature from the exothermic heat of the catalytic reactions with the exhaust gases.

The outer inlet end cone 34 forms an angle to a longitudinal direction, and the inner inlet end cone 33 forms an angle to the longitudinal direction 63, with both the outer and inner inlet end cones opening up as the exhaust gases flow into the catalytic converter 20. The spokes 40 of the illustrated supports 25 at the inlet end extend at an angle of about 45 degrees from the longitudinal direction 63, such that they interconnect the cones 33 and 34. It is noted that spokes 50 can extend angularly at either direction and can be connected to other components, e.g. outer housing 22 and/or intermediate housing 60. The spokes 50 of the illustrated supports 25' at the outlet end extend at an angle of about 45 degrees from the longitudinal direction 63, such that they interconnect the cones 43 and 44. The spokes 40 and 50 of the supports 25 form spokes that are circumferentially spaced around the bellows 38 and 48, and there are sufficient spokes 40 and 50 such that the inner housing 21 is stably supported within the outer housing 22 for non-contacting concentric support. The appearance in end view is much like a spoked wheel. The combination of the spoke-like bodies 40 with the cones 33 and 34 at the inlet end, and the spoke-like bodies 50 with the cones 43 and 44 at the outlet end, form a support structure capable of maintaining support on the inner housing 21 while still accommodating the different thermal expansion of the inner housing 21 relative to the outer housing 22 (particularly in a longitudinal direction). As illustrated, the spoke-like bodies 40 at the inlet end are longer than the spoke-like bodies 50 at the outlet end. A scope of the present invention is believed to include both configurations, and variations thereof.

When the catalytic converter 20 is in a cooled state and the exhaust gases begin to flow (i.e. when the engine is started), the inner and outer housings 21 and 22 will gradually heat, with the inner housing 21 heating much sooner and faster. As it heats, the inner housing 21 will lengthen by several millimeters, such as about 4-mm, ahead of the outer housing 22. The outer housing 22 also heats, but at a slower rate and with a delayed time period and also to a lower highest temperature. This causes longitudinally directed stress to occur on the supports 25 and 25'. The curvature of attachment flanges 41 and 51 to the bodies 40 and 50, respectively, and their general shape and angular attachment cause the bodies 40 and 50 to bend into a curvilinear/concave shape, and causes them to do so simultaneously and predictably as the inner and outer housings 21 and 22 undergo different thermal expansions. The pressure of supports 25 and 25' can also cause the outlet end cones 43 and 44 to bow slightly apart from each other, depending on the strength of the supports 25 and 25'. By this predictable bending, the cavity 26 is reliably maintained around the inner housing 21 such that it does not contact the outer housing 22.

The cross-sectional shape of the supports 25 and 25' is made sufficient to provide the functional strength required to hold the inner housing 21 in its isolated position within the outer housing 22, but the cross-sectional shape is minimized to reduce heat transfer along the supports 25 and 25'. The cross-sectional shape of the supports 25 and 25' vary greatly depending upon a weight of the inner housing 21 and components therein, depending upon loading (vibrational and impact) test requirements of the vehicle manufacturer, and depending upon test results and fine-tuning of the exhaust system on a given model vehicle. For example, the spokes can be made from 1.5 mm thick by 4-mm wide stainless steel material where at least four supports 25 (and 25') are used circumferentially around the inlet and outlets of the catalytic converter 20.

Figure 2:
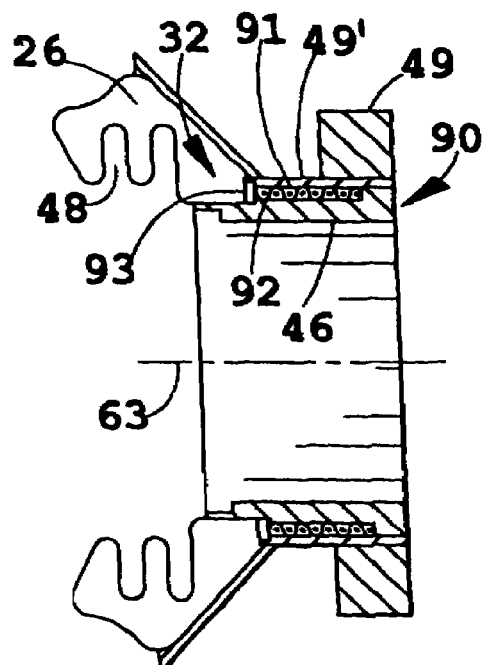
FIG. 2 is an enlarged view of an outlet end of the catalytic converter shown in FIG. 1.
Figure 3:
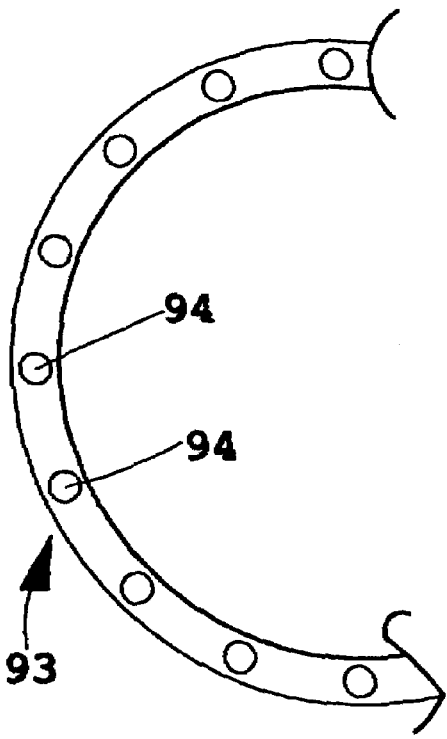
FIG. 3 is an end view of the containment ring shown in FIG. 2.

Containment Used for Passive Activation of Hydride Within Catalytic Converter (FIGS. 1-3)

The present invention allows for passive activation of a hydride by the exhaust gases flowing through the catalytic converter 20 (FIG. 1). The hydrogen source device 32 (FIG. 2) includes a containment structure 90, which includes parts of outlet tube section 46 and reinforcement tube 49' for containing the hydride material 91. The containment structure 90 is formed around (and in part by) the outlet tube 46 so that it is coupled to the exhaust stream in such a way as to allow activation of the hydride within a narrow temperature band and without any external control. The hydride material 91 releases hydrogen into the insulating cavity 26 at a rate that is related to the temperature and pressure of cavity 26, such that conductivity is increased as the temperature of the catalytic converter 20 increases. Thus, the arrangement provides an overtemperature protection mechanism for the catalyst or catalyst substrate 27 and 27' within the vacuum-insulated catalytic converter 20. The hydride material 91 is kept within the annulus section of the containment structure 90 by a fine wire mesh 92 (or porous sintered metal) that allows free flow of hydrogen. The fine wire mesh 92 is held in place by a containment ring 93 that has multiple holes 94 (FIG. 3) so as not to restrict the flow of hydrogen from the hydride to the interior cavity 26 of the catalytic converter 20.

A plurality of modified catalytic converters are disclosed below. In order to reduce redundant discussion, each successive modification uses the same identification numbers as the earlier described embodiment, but with the addition of a letter, such as "A", "B", and etc.

Passive Hydride and Getter Selection and Position
(FIGS. 4-10)

Figure 4:
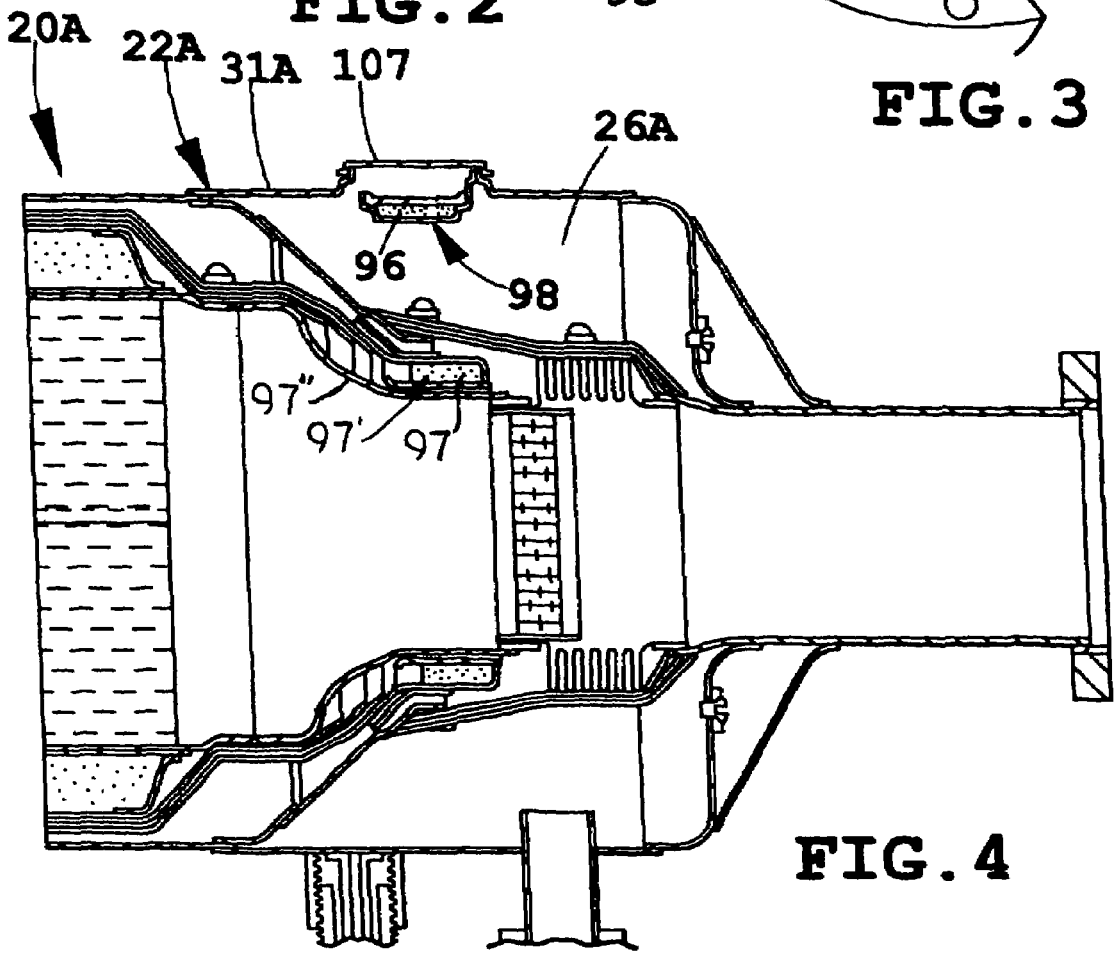
FIG. 4 is a fragmentary cross-sectional view of an outlet end of a modified catalytic converter.

This section discusses and proposes the use of a separate getter 96 and hydride 97 in a converter. The getter and hydride perform two different functions in the vacuum space. The getter is intended to act as a vacuum pump through the life of the converter. The hydride stores hydrogen gas that is released with elevated temperature, thereby acting as an overtemperature protection for the catalytic converter. Previous designs have provided the getter and hydride as one and the same component. This invention involves the use of two separate materials for the hydride and getter. There are distinct advantages in using different containers and positions for the hydride and getter. It is noted that the hydride 97 and getter 96 in FIG. 4 are illustrated as being held in separate container 98 and 97', but it is contemplated that they could be mixed and held in the same container, such as container 98 (see FIG. 7). Container 97' is ring-shaped and is supported by a support 97" that permits flow of gases between the container 97' and the insulation cavity 26A.

A getter is used in the vacuum insulation to maintain the vacuum during the life of the part. It does this by reacting with gases present thereby acting as a chemical vacuum pump. Eventually the getter material may completely react with gas and no longer function. The hydride is usually the same type of material as the getter; however, it is charged with hydrogen that is desorbed as a function of temperature. Hydrogen has a very high thermal conductivity so that a small amount of hydrogen in the vacuum space (a few torr pressure) will cause the space to conduct heat and no longer be insulating. The hydride can be consumed by getter-type reactions with other gas species and no longer be reversible. Separating the hydride and getter functions extends the functionality of the hydride preferably over the life of the component. Also, by using a different composition for the getter and hydride, the getter activation and release of hydrogen gas will occur at different temperatures. Specifically, a "ST707" brand material by SAES of Italy will have lower activation and hydrogen release temperatures than a "ST101" brand material by SAES. By using the "ST707" brand material for the getter function (i.e. getter 96), it can be activated as a getter during the latter stages of the vacuum bake-out, and even assist the vacuum bake-out. The SAES "ST101" brand material has a sufficiently high getter activation that will not be reached until the end of the vacuum bake-out, thereby preserving its capacity as a hydride (i.e. hydride 97); and hydride release temperature that will not be reached during bake-out thereby preserving its hydrogen.

The getter 96 and hydride 97 are contained in a container 98 attached to the outer wall 31A of the outer housing 22A. The container 98 (FIG. 7) includes a lower cup portion 99 where the getter 96 and hydride 97 are contained, and further includes an annular ring 100 and up flanges 101. A seal layer 102 covers the cup portion 99, holding the getter 96 and hydride 97 in the cup portion 99. The up flanges 101 include lips 102' that frictionally engage the extruded material 103 around the opening 104 in the wall 31A of outer housing 22A (FIG. 12). The container 98 can be extended through the opening 104 from the outside into the cavity 26A, with the lip 102' abutting the marginal material or extruded material or extruded neck 103 to hold the container 98 at a selected position. Detents or an inwardly direct crimp or flange is used to secure the porous cap in place. Also, a can-shaped structure can be used (see FIG. 16). Holes 105 (FIG. 6) in the up flanges 101 and also spaces 106 between the up flanges 101 assure that the getter 96 and the hydride 97 are in communication with the insulating cavity 26A. A vacuum detector/seal lid 107 is snapped over the opening 104 and sealed with braze to cover the opening 104. As described below, the lid 107 is flexible, and dimples when exposed to a vacuum, such that it acts as a vacuum indicator to show the presence of a vacuum (or lack of a vacuum) in the vacuum-insulating cavity 26A. It is contemplated that the getter 96 and/or the hydride 97 can be placed in the end cavity or hydrogen source device 32 (See FIG. 1), and/or in the container 98 (FIG. 4), and/or in both (in separate places or in the same place but as separate materials).

It is contemplated that the holes in the containment ring 93 can be varied in number and size to control use of the getter 96 and/or the hydride 97. (FIG. 3) Further, a brazing material 108 can be used to plug the holes 94 until after an initial bake out, so that the getter 96 is not entirely used up during initial bake out. For example, the brazing material 108 would cover the holes 94 during an initial low temperature bake, but would melt and unseal the holes 94 during a higher temperature bake.

Vacuum Detector/Seal Cap (FIGS. 11-14)

This invention is used on a vacuum-insulated catalytic converter to provide the customer with a physical and visual check of the presence of vacuum in the insulating cylinder, around the catalytic converter. It is a lid 107 (FIGS. 12-14) with a brim 110 which is pressed over and frictionally engages an extruded neck 103 (FIG. 12) formed by the marginal material around the opening 104 in the wall 31A of the outer housing 22A. The lid 107 can be brazed and sealed in a vacuum furnace to a corresponding embossment on the outer jacket of the converter. The lid 107 is preferably mechanically assembled to the outer jacket to help control the fit up for the brazing operation. The converter 20A is baked in a vacuum at a heat high enough to drive off all the water molecules that may be present. The braze operation will occur when the bake-out is complete, and the proper vacuum has been achieved. The assembly will be cooled under vacuum to a temperature that guarantees that the brazing material has re-solidified and the sealing is complete. As the product is cooled and the atmosphere is raised back up to normal, a flat center panel of the lid 107 will dimple in with the pressure differential like a jar lid does during the canning process of fruits and vegetables. As long as the vacuum stays intact, the dimple will remain.

The purpose of the invention is to provide the customer a quick gauge to diagnose whether or not the vacuum is still present inside the insulation cavity 26A which surrounds the core and inner housing 21A of the catalytic converter 20A. In use, the seal cap/lid 107 does two main functions. It closes the unit off to outside atmosphere as it is brazed to the outer jacket/outer housing 22A of the catalytic converter 20A. The hole 104 that the lid 107 is being brazed over is the final orifice for gas evacuation in the unit. All other joints have been sealed and tested for leaks at this point.

The cap/lid 107 is the gauge to detect the presence of the vacuum in vacuum insulation cavity 26A of the catalytic converter 20A. As the converter 20A is brought back into normal atmospheric pressure, the pressure differential of the cavity 26 to ambient is great enough to cause this thin walled cap/lid 107 to pop in. If the vacuum cavity 26A springs a leak, the insulation property of the catalytic converter unit is greatly reduced, and the outer shell/outer housing 22A of the converter 20A will become hot; but even before it shows signs of overheating, the cap/lid 107 will have popped up. A thermal couple can be to the jacket attached to detect the presence of abnormal heat to the outside skin/wall 31A of the catalytic converter 20A. A light on the dash will warn the motor vehicle operator of the overheating condition. This condition can be caused by several events, but the seal cap/lid 107 makes it possible to quickly verify whether the loss of the vacuum is the reason for the warning.

Figure 15:
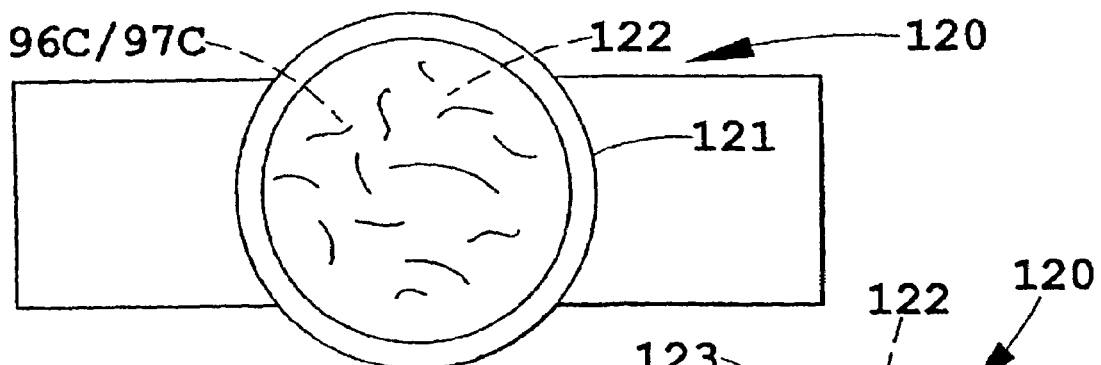
FIGS. 15-16 are plan and side views of a modified container for containing getter and hydride material, the container including flanges for attachment to the outer housing.
Figure 17:
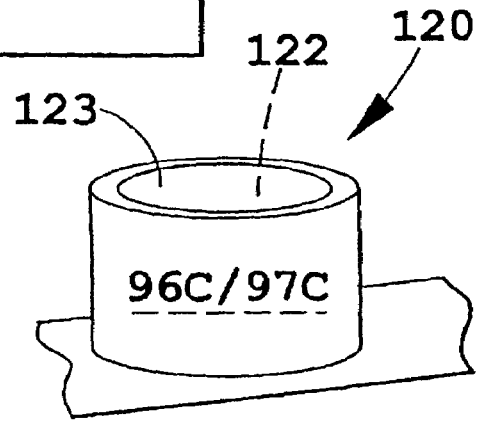
FIG. 17 is a perspective view of the container shown in FIG. 15.
Figure 16:
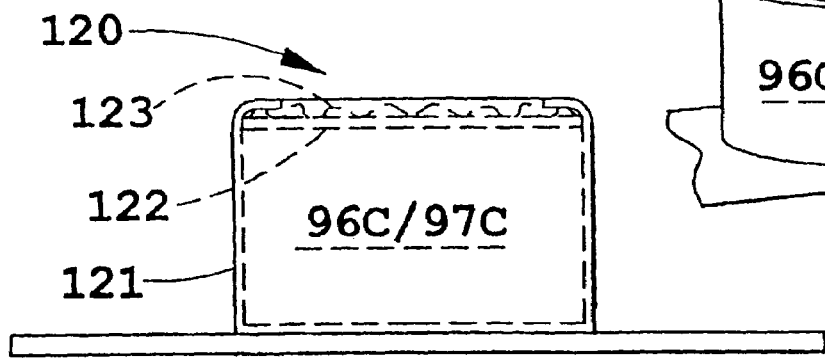

Reversible Getter Atmosphere Protection During Build and Bake-Out (FIGS. 15-17)

A getter or getter-hydride may be incorporated into the vacuum space of the vacuum-insulated catalytic converter. This will necessitate exposing the getter-hydride to atmosphere during fabrication and also to low levels of gas during pump-down and bake-out of the unit. To isolate the getter-hydride from gas exposure until the unit has been baked-out and sealed, the following canister construction will provide protection and can then be passively removed during normal operation of the unit.

The getter/hydride unit 120 including getter/hydride material 96C/97C (FIGS. 15 and 16) is contained in the metal can 121 of some higher melting point material, e.g., stainless steel. A porous lid 122 contains the getter/hydride powder 96C/97C but allows gas communication with the atmosphere in the vacuum space 26. A metal foil 123 initially covers the porous metal lid 122 of the container/can 121 (FIG. 17). This metal foil 123 could be brazed on or even simply wrapped over the top and crimped in place using a wire. The metals Magnesium (Mg) or Aluminum (Al) would be particularly effective because in addition to providing a physical barrier they would react with any $O_2$ or $H_2O$ present during the bake-out step. It is expected that $H_2O$ will outgas or dissolve from the vacuum space surfaces especially during the bake-out step. Therefore the Mg or Al foil will also act as an initial getter and provide a chemical barrier for the permanent getter-hydride.

After the unit is evacuated, baked-out and sealed, the unit will be put in operation. Once a unit reaches ~642° C. (m.p. of Mg) or ~660° C. (m.p. of Al), these foils 123 will melt and provide or allow the porous metal top 122 to now be exposed to the vacuum space. The Mg will be particularly quick to dissipate as it has very little interaction with steel and has a high vapor pressure.

Figure 18:
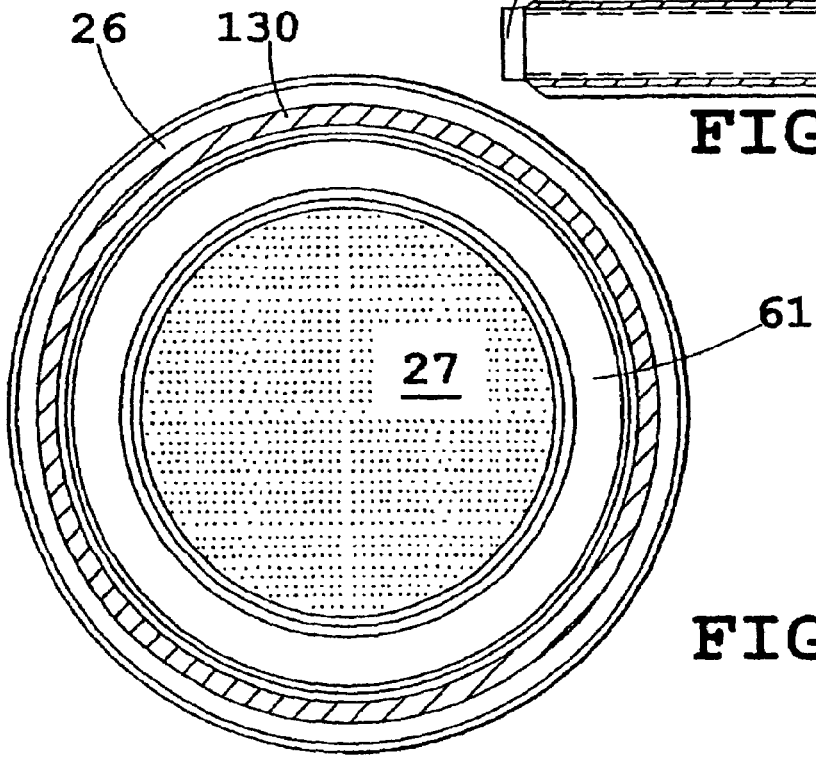
FIG. 18 is a cross-sectional view of aluminum and copper foils and ceramic and fiberglass insulations incorporated into the radiation shield.

Aluminum Foil Incorporated into the Radiation Shields as a Getter (FIG. 18)

Aluminum foil is very reactive with oxygen, especially at elevated temperatures encountered in a catalytic converter. Two of the main gases released during the bake-out of the assembled converter are $H_2O$ and CO. A large source of these gases is the surface area of the multi-layer radiation shields 130 (FIGS. 18 and 20) within the converter 20. By incorporating aluminum foil within the layers of the radiation shields 130, the aluminum foil can combine with the oxygen present in these gases and act as a getter adjacent to the source of the gas, i.e., the radiation shields 130.

The aluminum foil will act to combine or getter with some of the gases evolved during bake-out of the converter. This gettering action will take place within the radiation shielding which is the main source of gases during bake-out. The close proximity of getter to out-gassing will speed up the bake-out. Aluminum foil should also be less costly than typical getter materials that will also be used within the converter.

Getter Sealing

The getter should not be exposed to the interior of the catalytic converter during bake-out of the converter which dispels unwanted gases and vaporizable materials. If the getter is exposed to the bake-out gases while at elevated temperature, the getter capacity for outgassing when the catalytic converter is sealed off will be greatly reduced. A way of preventing the getter from being exposed to the various gasses during bake-out is to seal the getter chamber with a brazed gate. The getter chamber 150 (FIG. 19) can be a small stainless steel tube 151 capped on one end with a stainless steel plug 152 and the other with a thin stainless steel foil 153 brazed to the interior walls of the stainless steel tube. The brazing of the foil to the stainless steel tube can occur under a vacuum. The tube could then be welded or brazed to the outside of the catalytic converter. Once the catalytic converter has been baked-out, the brazed metal gate could be removed by applying heat to the brazed foil with an induction coil or some other device. The getter would be activated during the bake-out of the catalytic converter. A variation of this concept would be to seal the getter chamber with solder material of appropriate melting point to remain solid during bake-out, but which could be melted away following bake-out.

High-volume production of the catalytic converter is expected to involve baking out multiple converters within a large vacuum oven to drive out impurities, and then sealing the pump-out port of the catalytic converter within the vacuum oven. A unique way of doing this is to have a small slit made in the outside cylinder of the converter with braze material about the slit opening. Once the bake-out is completed a heater such as a radiation heater could be used to bring the braze material temporarily to its melting point, followed by cooling to solidify the brazing metal, thereby closing the opening used for evacuation.

Figure 19:
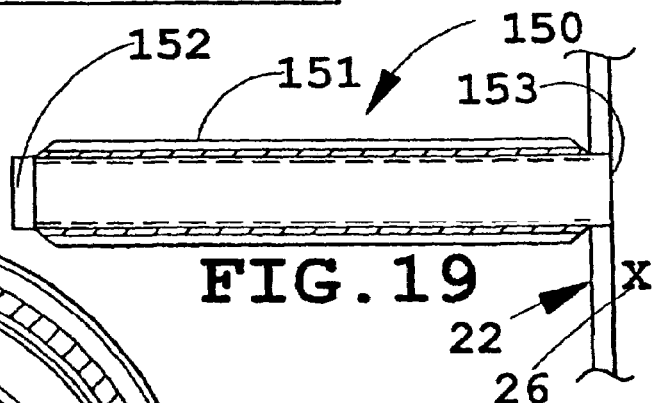
FIG. 19 is a side view of a tube incorporating the getter and hydride material of FIG. 15.

Leafed Layered Radiation System (FIG. 19-20)

A vacuum-insulated catalytic converter by design keeps its inner core or catalyst substrate 27A' and the inner housing 21A, hot long after the engine has been turned off. To do this, the inner core 27A', inner housing 21A, outlet end cones 43A, end tube 47A, and baffle or bellows 48A, as well as the corresponding elements on the inlet side of the catalytic converter, which couple it to the exhaust system are surrounded by material, such as phase change material (PCM) 129, which stores heat. This heat can then be reabsorbed into the catalytic converter as the converter starts to cool. This PCM material is in turn wrapped with other materials, such as radiation reflector and insulator or multi-layer radiation shield 130, that reflect and insulate. Metal foils are used to reflect the radiant heat back into the core. Because of their low emissivity, nonferrous metals such as copper and aluminum are the foils of choice. Between the layers of foil are layers of insulating material, such as a ceramic material, which keep the metal foil from contacting the layer immediately beneath it and above it. The insulation material 131 is designed to be just wider than the foils 132 with which it is interleaved, to prevent the foils 132 from contacting the other layers of foil 132 along their surface.

The foils 132 and interleaved insulation material 131 are preferably sized such that each strip 130 wraps to make five layers. Each strip width is sized to optimize the coverage needed. Each strip 130 extends in width proportionally until the whole core and inner housing 21A is covered. This is presently accomplished by four strips having overlapping edges, such as at location 134. The configuration overlaps and extends in section much like a leaf spring. (See the overlapped area 134 in FIG. 20). With the present design, there are three of these stair-stepped radiation shield configurations used, one strip 130 over the center core and one strip 130A over the bellows at either end of the center core. Each strip 130/130A as it is rolled on is crimped to assist in keeping the wrappings tight and in place as the next strip 130/130A is applied. The final strip 130/130A may be secured with a couple of stainless steel straps 135. Only one strap 135 may be required about each of the bellows.

The purpose of the leafed layered radiation system is to contain and reflect the heat radiated from the catalytic converter and the vessel containing the phase change material back into the core. This focusing at the same time keeps the outer jacket/outer housing 21 cool. During the initial heat up of the catalytic converter, the system helps to contain the heat from the exhaust and keep it stored on the center core. This enables the whole system to heat more quickly. After the engine is turned off, the radiation material keeps the radiant heat reflected back into the core. The interleaved material is a ceramic or fiberglass paper to keep the copper or aluminum foil layers from conveying heat from one layer to another, since this would reduce hold time if the layers thermally shorted the heat between them.

Optimum Wrapping of Radiation Shields (FIG. 20)

The improved design reported here adds novel features to the present design: a loose coupling (primarily by radiative conductance) between the thermal energy storage material and the converter. To minimize heat transfer between the bellows (or outer shell) and the radiation shields, the shields layers should increase from inner to outer layers so that the inner layers end at the inner (hot) portion of the bellows and the outer radiation shield layers end at the outer (cold) end of the bellows.

Figure 23:
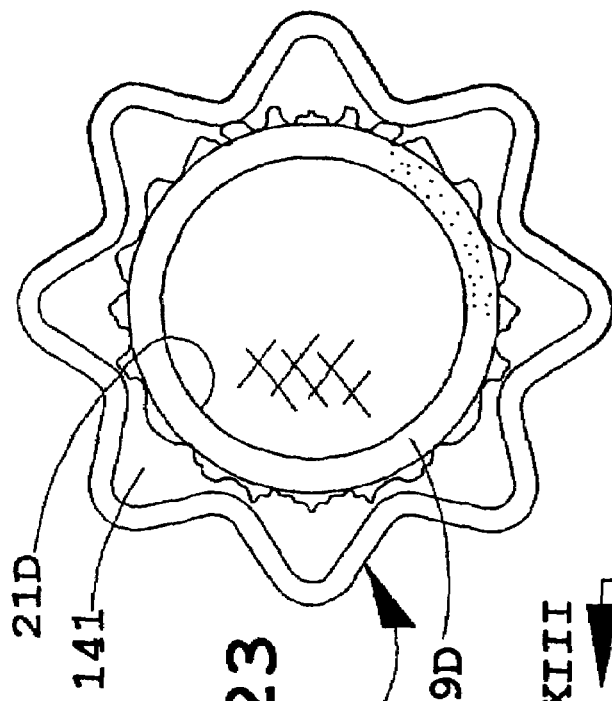
FIG. 23 is a cross-sectional view taken along the line XXIII-XXIII in FIG. 21.
Figure 22:
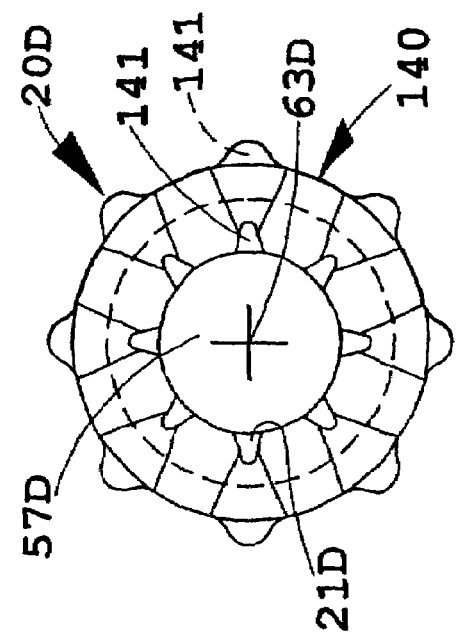
FIG. 22 is an end view of the catalytic converter shown in FIG. 21.
Figure 21:
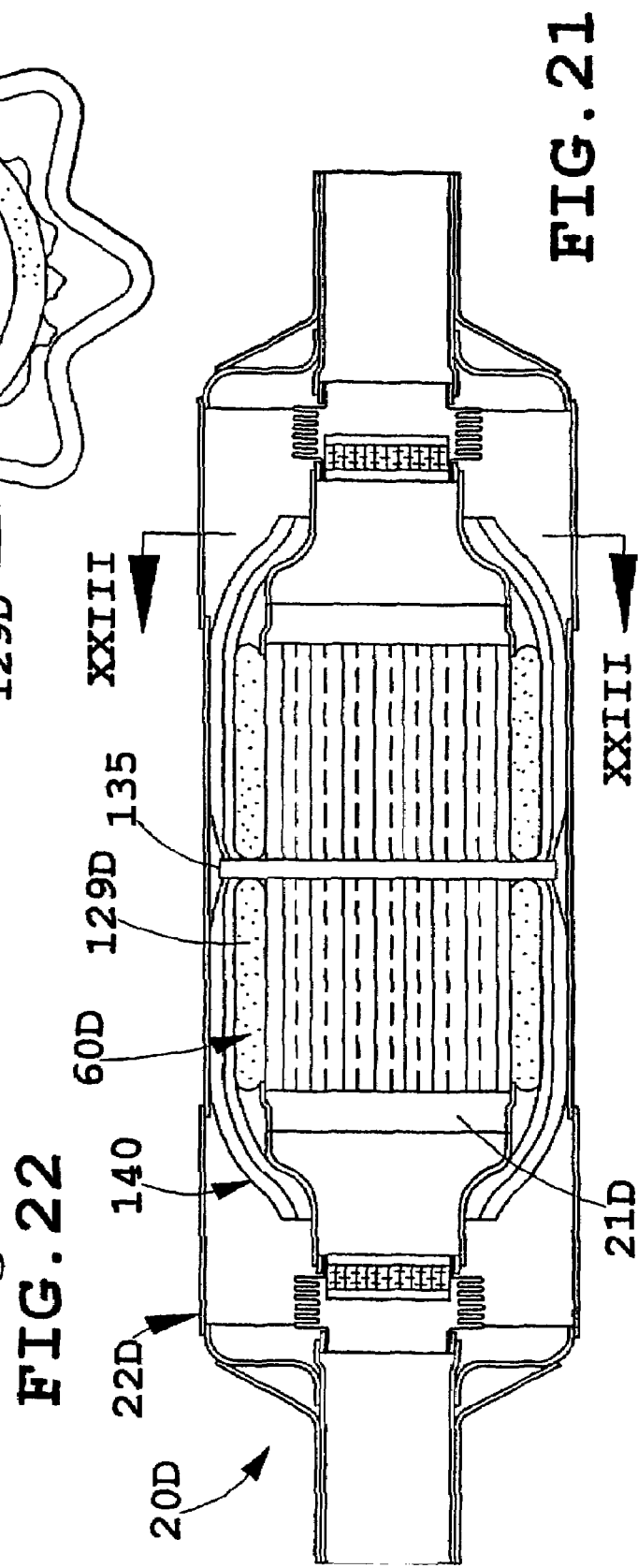
FIG. 21 is a side cross-sectional view of a modified catalytic converter including a loosely-attached radiation shield with air passages coupled to the inner housing of the catalytic converter.

Hydrogen Passages Between Radiation Shields and Core of Vacuum-Insulated Catalytic Converter (FIGS. 21-23)

The catalytic converter 20D has a multi-layer radiation shield 140 (FIG. 21) wrapped around a core and variable conductance vacuum insulation between the core/inner housing 21D and jacket/outer housing 22D. The radiation shields 140 are part of the insulation for the unit, and it is desirable to minimize contact between the core/inner housing 21D and the radiation shields 140. Minimum contact will inhibit conductance of heat between the radiation shields 140 and the core/inner housing 21D and the phase change materials 129D, thereby increasing the insulation effectiveness. Under some circumstances it is desirable for the converter core to rapidly lose heat. This can be done by increasing the gas phase thermal conductance of the vacuum insulation system. Hydrogen gas released in the vacuum space can be used to increase heat transfer between the hot core/inner housing 21D and cold jacket/outer housing 22D. The creation of passageways between the radiation shield 140 and the hot core will allow a quicker heat transfer between the hot core/inner housing 21D and cold jacket/outer housing 22D via gas conductance. An example of such a construction is axial passages 141 (FIG. 23), eight to sixteen in number, equally spaced around the perimeter of the core/inner housing 21D, and formed in the radiation shield 140. The radiation shield 140 may be secured to the core/inner housing 21D with one steel strap 135 at mid-length to wedge the radiation shield 140 in the gap between two phase change material containers 60D.

Current designs wrap their radiation shields tightly around the core/inner housing. This results in continuous conduction between the hot core and the radiation shields, and also makes very small and tortuous paths for hydrogen gas to flow. The novel axial passages shown in FIGS. 21-23 provide effective heat transfer by allowing hydrogen gas to freely flow, contact the hot core and transfer heat to the cold jacket. An inlet radiation shield 141' and an outlet radiation shield 142 are added to catalytic converter 20D (FIG. 23A) at a location against the baffles 38D and 48D, respectively. An inlet radiation shield 143 and an outlet radiation shield 144 are added to catalytic converter 20D (FIG. 23B) at a location loosely against an inner surface of the outer housing 22D. All radiation shields 140-144 are loosely held by metal straps 135 or other structure (including their own stiffness) for optimal hydrogen flow around them.

Each radiation shield 140-144 includes multiple layers of foil and insulation, such as a total of twenty layers. It can be difficult and time consuming to wrap and form the radiation shields around the inner housing 21D. It is conceived that the radiation shields can be preformed and sliced longitudinally by a water jet or laser to form a clam shell arrangement. The metal straps 135 would hold the clamshells together. Alternatively, the preforms can be cut transversely and slipped onto ends of the catalytic converter inner housing 21D.

Converters with Split Radiation Shield

A modified catalytic converter 20HH (FIG. 24) includes a support 25HH at its inlet end having an inner ring flange or hub 51HH, an outer ring flange or rim 52HH, and spokes 50HH connecting the hub 51HH to the rim 52HH. The outer ring flange 52HH has wire mesh feet 65HH that slidably engage the inner inlet tube section 36HH of the inner housing 21HH to permit longitudinal expansion of the inner housing 21HH to the outer housing 22HH without undesirable distortion of components. The catalytic converter 20HH further includes a support 25HH' at its outlet end having an inner ring flange or hub 51HH, an outer ring flange or rim 52HH, and spokes 50HH extending between the hub 51HH and the rim 52HH. The support 25HH' at the outer end provides a fixed support for the inner housing 21HH, such that the resulting greater longitudinal expansion of the inner housing 21HH over the outer housing 22HH due to dissimilar thermal expansion occurs at the inlet end.

An end construction 90HH at the outlet end is particularly constructed to facilitate manufacture of the catalytic converter 20HH and to maintain a very good thermal barrier. The end construction 90HH includes a cylindrical wall extension 91HH that sealingly engages and is brazed to the wall 31HH of the outer housing 22HH. The end construction 90HH further includes a separated and extended outlet tube section 92HH that extends from bellows 48HH. The extended outlet tube section 92HH in effect replaces the inner outlet tube section 46 (FIG. 1) and serves a similar attachment function for connection to an exhaust pipe of the vehicle. First and second extended cone sections 93HH and 94HH extend from the wall extension 91HH. The cone sections 93HH and 94HH have ring-shaped inner ends that overlap onto each other and onto the wall extension 91HH to form a rigid, sealed connection to the outer housing 22HH. The cone sections 93HH and 94HH have outer ends that are spaced apart from each other and that engage opposing ends of the extended outlet tube section 92HH. The cone sections 93HH and 94HH hold the outlet tube section 92HH in alignment with the bellows 48HH at an end of the bellow 48HH. The inner (i.e. second) cone section 94HH includes spokes or vacuum communication ports instead of comprising a continuous funnel-shaped member, but the first (i.e. outer) cone section 93HH is continuous and funnel-shaped so that the vacuum can be held in the cavity 26HH. The combination of the spokes 50HH and the cone sections 93HH and 94HH at the outlet end of the catalytic converter 20HH provide a very stable and sturdy structure, yet one which is highly thermally insulated.

A radiation shield 72HH is provided in three sections, including a center section 95HH that wraps around and covers the phase change material housing 60HH, and end sections 96HH and 97HH that wrap around and cover the inlet and outlet ends of the converter 20HH (including the bellows 38HH and 48HH). It is noted that the end sections 96HH and 97HH overlap onto longitudinal edges of the center section 95HH to provide maximum radiation-resisting values, yet to allow the spokes 50HH at each end to extend between the inner and outer housings 21HH and 22HH. The inlet end section of the catalytic converter 20HH is similar to the outlet end section, and its description need not be repeated in order for a person of ordinary skill to understand the present construction, or for such a person to understand the inventive aspects thereof.

The catalytic converter 20II (FIGS. 25 and 26) includes an outlet end section similar to that of catalytic converter 20HH, but the catalytic converter 20II includes a vacuum maintenance device 32II that includes getter material for maintaining a high vacuum in the cavity 26II. Alternatively, or at the same time, the vacuum maintenance device 32II may include hydride material for passively increasing the amount of hydrogen gas within the cavity 26II when the inner housing 21II heats up. By increasing hydrogen gas at high temperature, the insulative value of the vacuum cavity 26II is reduced, thus helping throw off and helping to prevent overheating of the catalytic converter 20II. By reducing hydrogen gas at low temperature, the insulative value of the vacuum cavity 26II is increased, thus assisting in faster heat up of the catalyst in the catalytic converter 20II during initial engine starts. Notably, the device 32II is positioned relatively close to the inlet or outlet tube section 92II such that it quickly receives heat from hot gases passing through the catalytic converter 20II. These hot gases are indicative of the temperature of the catalyst material in the catalytic converter 20II. As a result, the device 32II is able to quickly respond to actual temperature conditions of the catalytic material, which can be important to good operation.

In order to quickly and economically achieve a high vacuum in the cavity 26II, it is necessary to bake the catalytic converter 20II at high temperature so that gases and volatile agents are driven off. However, hydride materials, which release hydrogen at high temperatures, are undesirably activated to release their hydrogen at the same high temperatures necessary for a good bake-out. Further, after the bake-out, the cavity 26II must be sealed to maintain the vacuum. A problem occurs in that it is difficult to bake-out a cavity 26II and then seal the cavity 26II to maintain the high vacuum, without also prematurely activating the getter or hydride materials. The end construction shown in FIG. 25 solves this problem.

As shown in FIG. 26, the end construction of FIG. 25 replaces the outer end cone (93HH) with an inner ring flange 99II, an outer ring flange 100II, and a frustoconically-shaped member 101II (sometimes called a "cover"). The frustoconically-shaped member 101II includes an "in" flange 102II and an "out" flange 103II. The inner ring flange 99II is attached to an outer end of the extended outlet tube section 92II that extends from bellows 48II, and flares outwardly. The outer ring flange 100II is attached to the cylindrical wall extension 91II of outer housing 22II. The components of catalytic converter 20II are baked off as shown in FIG. 26. After bake-out, the "in" flange 102II is shaped to engage the inner ring flange 99II when the frustoconically-shaped member 101II is brought into engagement with the end of the outer housing 22II. The "out" flange 103II is shaped to simultaneously engage the outer ring flange 100II when the frustoconically-shaped member 101II is brought into engagement with the outer housing 22II. This simple movement of parts in a longitudinally-aligned direction is easily achieved, even while the parts are continuously held in the high vacuum after bake-out. Once the frustoconically-shaped member 101II is engaged with the outer housing 22II, the bake-out temperature is increased sufficiently to melt brazing material 105II located on the "in" flange 102II to seal the "in" flange 102II to the inner ring flange 99II, and to melt brazing material 106II on the "out" flange 103II to seal the "out" flange 103II to the outer ring flange 100II.

The hydride and/or the getter material of device 32II is located on an inside of the body of the frustoconically-shaped member 101II. Notably, the frustoconically-shaped member 101II is separated from inner and outer housings 21II and 22II of the catalytic converter 20II and related components during the bake-out. By directing the heat of the bake-out at the inner and outer housings 21II and 22II and at the related components of that subassembly (and by keeping the subassembly that includes the hydride and getter materials at a cooler lower temperature), the properties and characteristics of the hydride and getter material are preserved so that they are not wasted. (i.e. The hydrogen in the hydride is not prematurely driven off, and the gas sorbing capacity of the getter is not prematurely used up.) Once the subassembly of the frustoconically-shaped member 101II is brought into engagement with the ring flanges 102II and 103II, additional heat is applied to the assembly to melt the brazing material 105II and 106II. It is noted that this additional heat may activate the getter material, but this is not a problem since the bake-out has already occurred and the cavity 26II is under vacuum. Thus, when the getter material cools and become active, it merely begins doing its intended job, which is to absorb gas to maintain the high vacuum. It is noted that this additional heat may activate the hydride material, but this is not a problem since, as noted above, the bake-out has already occurred and the cavity 26II is sealed. Thus the hydride material merely begins doing its intended job, which is to release hydrogen into the cavity 26II when the hydride is at an elevated temperature.

For getters to become active, that is, to become able to sorb gaseous impurities present within the vacuum space, one must first eliminate the protective oxide film on the getter particle surface. In such a way, the active part of the getter will be exposed, come into contact with the gases and capture the molecules which have to be sorbed. The elimination of the oxide film is done by increasing the getter temperature under vacuum and maintaining this temperature per a time/temperature relationship. This procedure, known as activation of the getter, causes the initial oxide film to diffuse into the bulk of the getter particles, thus leaving the surface free from the passivating layers and therefore available for the sorption of gases.

Figure 27:
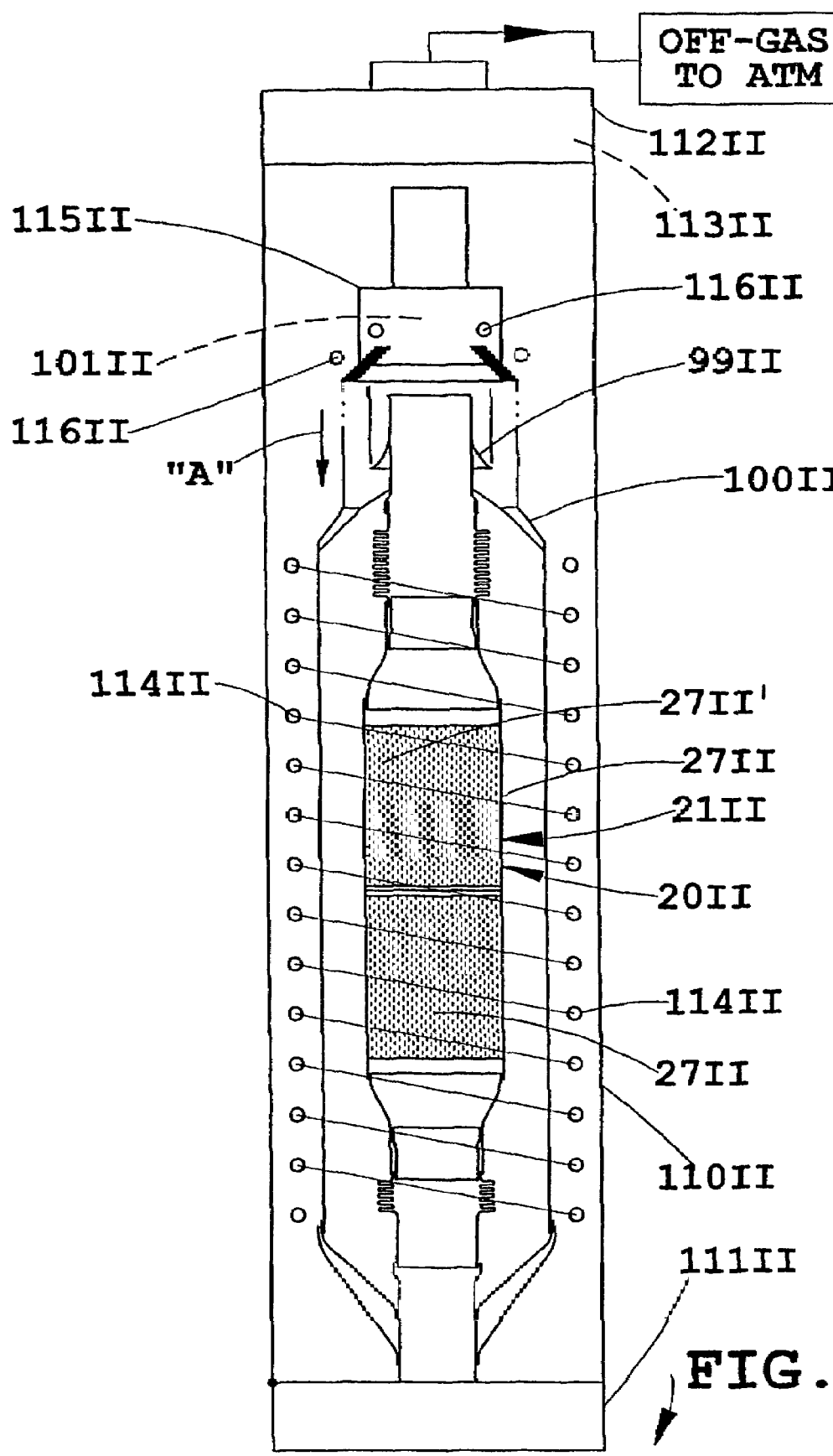
FIG. 27 is a view of the catalytic converter of FIG. 26 shown in a bake-out chamber.

The process of bake-out (FIG. 27) includes positioning the main subassembly of the catalytic converter 20II (i.e. that portion including the inner and outer housings 21II and 22II, and the catalytic material or catalyst substrate 27II and 27II', and other components) and positioning the end construction (i.e. that portion including the frustoconically-shaped member 101II, and the vacuum maintenance device 32II) in an enclosed machine chamber 110II. The chamber 110II is closed at one end by an end cover 111II and at its other end by a second end cover 112II that incorporates a turbo pump 113II for drawing a vacuum. Primary induction coils 114II are located around and proximate the outer housing 22II. The primary induction coils 114II are powered to create bake-out temperatures in the range of 450 degrees C. An actuator gripper 115II holds the frustoconically-shaped member 101II at a location axially aligned with the outer housing 22II, but at a location spaced above the outer housing 22II. By this arrangement, the frustoconically-shaped member 101II does not become quickly heated by the primary induction coils 114II, but instead stays at a lower temperature. Thus, the hydride and the getter material in the device 32II do not prematurely activate. When the bake-out is completed, the frustoconically-shaped member 101II is lowered in direction "A" onto the inner and outer housings 21II and 22II, such that the "in" flange 102II engages brazing material 105II on the flange 99II, and the "out" flange 103II engages the brazing material 106II on the flange 100II. The actuator gripper 115II includes secondary induction coils 116II that are arranged and located to melt the brazing material 105II and 106II to seal the vacuum in the cavity 26II of the catalytic converter 20II. Upon the brazes cooling and solidifying, the chamber is vented to atmosphere and part removed. The reversible getter is activated by exposure to a heat source for some time.

Another benefit of this design is the reversible getter's close proximity to the exhaust pipe provides for passive re-activation (of the reversible getter). During vehicle operation, high temperature events or micro-leaks will produce additional gases in the vacuum space. These gases will be pumped by the getter and eventually passivate its surface, thus rendering it inactive. Therefore, during the life of the vehicle, the getter may require additional re-activations to be an effective vacuum pump. By frequent exposure to the exhaust heat, the getter will be re-activated. Depending on the amount of gases pumped by the getter, a typically sized getter has the capacity for approximately ten passivation and re-activation cycles.

Particulate Trap for Diesel Emissions

A particulate trap 160JJ (FIG. 28) is often used to trap soot and carbon particulates in the exhaust of diesel engines, and to burn off these particles in a safe and non-polluting manner. The present technology can also be used in particulate traps, as described below. The detail of particulate traps and their operation is not needed for an understanding of the present invention. It is sufficient to know that particulate traps require considerable heat and have a relatively high operating temperature for optimal operation. During cold starts, when the particulate trap is cold, it is inefficient and does not operate effectively. Accordingly, all of the discussion above in regard to providing thermal control and management of the vacuum cavity applies, including the discussion relative to PCM materials, vacuum atmospheric/hydrogen control and insulative control, and reflective shields.

Particulate trap 160JJ is similar to the converter structure or catalytic converter 20 in that the particulate trap 160JJ includes inner and outer housings 21JJ and 22JJ spaced apart to define a vacuum cavity 26JJ around the inner housing 21JJ. The inner and outer housings 21JJ and 22JJ include inlet and outlet ends where exhaust is received and emitted, respectively. An intermediate housing 60JJ holds PCM material adjacent the inner housing 21JJ. Getter material is provided to maintain the vacuum in the cavity 26JJ for a long service life. Hydride materials are provided to emit hydrogen once an operating temperature is achieved, so that the particulate trap does not overheat. Radiation shields 72JJ are wrapped loosely around the intermediate housing 60JJ for reflecting heat energy to prevent undesired heat loss. It is to be understood that the cavity 26JJ can be actively or passively thermally managed. A particulate trapping mechanism 161JJ is positioned within the inner housing 21JJ and potentially includes a regeneration method of fuel fired thermal assist or fuel additive chemical assist to promote complete burning of the carbon particles and soot found in diesel exhaust. The particulate trapping mechanism 161JJ is specifically designed for particular circumstances and operating parameters, such as for emissions expected from a particular engine size and transmission combination. It is contemplated that the excellent insulating properties of the present vacuum insulation structures will help substantially reduce the weight and size of particulate traps 160JJ.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for making an exhaust treatment device, comprising:

providing a housing assembly including an inner housing supporting an exhaust treatment device therein, and an outer housing enclosing the inner housing and defining an insulation cavity therebetween;

providing an end cover adapted to mate with and enclose one end of the insulation cavity;

mounting a temperature-activated variable insulation device on an interior side of the end cover for communication with the insulation cavity;

applying solder to those portions of the end cover which mate with and abut the housing assembly to enclose the one end of the insulation cavity;

providing an airtight chamber with an interior adapted to receive the housing assembly and the end cover therein;

positioning a first heater adjacent a first portion of the chamber to heat the housing assembly when the same is positioned in the chamber;

positioning a second heater a spaced apart distance from the first heater to heat the end cover when the same is positioned in the chamber;

opening the chamber to access the interior thereof;

19 positioning the housing assembly in the chamber at a location therein adjacent the first heater;
positioning the end cover in the chamber at a location spaced apart from the housing assembly and the first heater;
activating the first heater to heat the insulation cavity of the housing assembly to a predetermined bake-out temperature sufficient to drive off undesirable residue and gases from the insulation cavity, yet maintain the end cover at a temperature below the activation temperature of the variable insulation device to avoid premature activation of the same;
drawing at least a partial vacuum in the chamber to create a predetermined vacuum in the insulation cavity for reduced heat transfer between the inner housing and outer housing;
shifting the end cover into an abutting aligned relationship with the housing assembly, such that the solder on the mating portions of the end cover contacts the one end of the housing assembly;
activating the second heater to melt the solder and fuse together the housing assembly and the end cover to define an exhaust treatment device;
deactivating the first and second heaters;
cooling the housing assembly and the end cover to a temperature sufficient to solidify the solder, and thereby form an airtight seal between the housing assembly and the end cover; and
opening the chamber, and removing the exhaust treatment device from the chamber.

2. A method as set forth in claim 1, wherein:
said insulator mounting step includes mounting a getter material on the interior side of the end cover.

3. A method as set forth in claim 2, wherein:
said insulator mounting step further includes mounting a hydride material on the interior side of the end cover.

4. A method as set forth in claim 3, wherein:
said solder applying step includes applying a brazing material to those portions of the end cover which mate with and abut the housing assembly.

5. A method as set forth in claim 4, wherein:
said end cover providing step includes forming a frusto-conically-shaped member.

6. A method as set forth in claim 5, wherein:
said first heater activating step includes heating the insulation cavity to a temperature of around 450° C.

7. A method as set forth in claim 6, wherein:
said chamber providing step includes positioning the chamber in a substantially vertical orientation, with an access opening disposed adjacent an upper end thereof.

8. A method as set forth in claim 7, wherein:
said housing assembly positioning step comprises lowering the housing assembly into the chamber to a position adjacent a lower end of the chamber.

9. A method as set forth in claim 8, wherein:
said end cover positioning step comprises lowering the end cover into the chamber to a position above and spaced apart from the housing assembly.

10. A method as set forth in claim 9, wherein:
said end cover shifting step comprises lowering the end cover into an abutting relationship with the housing assembly.

11. A method as set forth in claim 10, wherein:
said first heater activating step comprises induction heating the housing assembly.

20

12. A method as set forth in claim 11, wherein:
said second heater activating step comprises induction heating the end cover.

13. A method as set forth in claim 12, including:
venting the chamber before said chamber opening step.

14. A method as set forth in claim 13, wherein:
said insulator mounting step further includes mounting a hydride material on the interior side of the end cover.

15. A method as set forth in claim 14, wherein:
said solder applying step includes applying a brazing material to those portions of the end cover which mate with and abut the housing assembly.

16. A method as set forth in claim 14, wherein:
said end cover providing step includes forming a frusto-conically-shaped member.

17. A method as set forth in claim 14, wherein:
said first heater activating step includes heating the insulation cavity to a temperature of around 450° C.

18. A method as set forth in claim 14, wherein:
said chamber providing step includes positioning the chamber in a substantially vertical orientation, with an access opening disposed adjacent an upper end thereof.

19. A method as set forth in claim 18, wherein:
said housing assembly positioning step comprises lowering the housing assembly into the chamber to a position adjacent a lower end of the chamber.

20. A method as set forth in claim 18, wherein:
said end cover positioning step comprises lowering the end cover into the chamber to a position above and spaced apart from the housing assembly.

21. A method as set forth in claim 18, wherein:
said end cover shifting step comprises lowering the end cover into an abutting relationship with the housing assembly.

22. A method as set forth in claim 14, wherein:
said first heater activating step comprises induction heating the housing assembly.

23. A method as set forth in claim 14, wherein:
said second heater activating step comprises induction heating the end cover.

24. A method as set forth in claim 14, including:
venting the chamber before said chamber opening step.

25. A method for making an exhaust treatment device, comprising:
providing a housing assembly including an inner housing supporting an exhaust treatment device therein, and an outer housing enclosing the inner housing and defining an insulation cavity therebetween;
providing an end cover adapted to mate with and enclose one end of the insulation cavity;
mounting a temperature-activated variable insulation device on an interior side of the end cover for communication with the insulation cavity;
applying solder to those portions of the end cover which mate with and abut the housing assembly to enclose the one end of the insulation cavity;
providing an airtight chamber with an interior adapted to receive the housing assembly and the end cover therein;
opening the chamber to access the interior thereof;
positioning the housing assembly in the chamber at a location adjacent one end thereof;
positioning the end cover in the chamber at a location spaced apart from the housing assembly;
heating the insulation cavity of the housing assembly to a predetermined bake-out temperature sufficient to drive off undesirable residue and gases from the insulation cavity, yet maintain the end cover at a temperature below the activation temperature of the variable insulation device to avoid premature activation of the same;

drawing at least a partial vacuum in the chamber to create a predetermined vacuum in the insulation cavity for reduced heat transfer between the inner housing and outer housing;

shifting the end cover into an abutting aligned relationship with the housing assembly, such that the solder on the mating portions of the end cover contacts the one end of the housing assembly;

heating the end cover to a predetermined soldering temperature sufficient to melt the solder and fuse together the housing assembly and the end cover to define an exhaust treatment device;

cooling the housing assembly and the end cover to a temperature sufficient to solidify the solder, and thereby form an airtight seal between the housing assembly and the end cover; and opening the chamber, and removing the exhaust treatment device from the chamber.

26. A method as set forth in claim 25, wherein:

said insulator mounting step includes mounting a getter material on the interior side of the end cover.

27. A method as set forth in claim 26, wherein:

said insulator mounting step further includes mounting a hydride material on the interior side of the end cover.

28. A method as set forth in claim 27, wherein:

said solder applying step includes applying a brazing material to those portions of the end cover which mate with and abut the housing assembly.

29. A method as set forth in claim 28, wherein:

said end cover providing step includes forming a frusto-conically-shaped member.

30. A method as set forth in claim 29, wherein:

said insulation cavity heating step includes heating the insulation cavity to a temperature of around 450° C.

31. A method as set forth in claim 30, wherein:

said chamber providing step includes positioning the chamber in a substantially vertical orientation, with an access opening disposed adjacent an upper end thereof.

32. A method as set forth in claim 31, wherein:

said housing assembly positioning step comprises lowering the housing assembly into the chamber to a position adjacent a lower end of the chamber.

33. A method as set forth in claim 32, wherein:

said end cover positioning step comprises lowering the end cover into the chamber to a position above and spaced apart from the housing assembly.

34. A method as set forth in claim 33, wherein:

said end cover shifting step comprises lowering the end cover into an abutting relationship with the housing assembly.

35. A method as set forth in claim 34, wherein:

said insulation cavity heating step comprises induction heating the housing assembly.

36. A method as set forth in claim 35, wherein:

said end cover heating step comprises induction heating the end cover.

37. A method as set forth in claim 36, including:

venting the chamber before said chamber opening step.

\* \* \* \* \*